(12) United States Patent
Bildstein et al.

(10) Patent No.: US 7,658,066 B2
(45) Date of Patent: Feb. 9, 2010

(54) ACTUATION DEVICE

(75) Inventors: Markus Bildstein, Oberstaufen (DE);
Klaus Schmelz, Grünenbach (DE);
Philipp Kegel, Heimenkirch (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 251 days.

(21) Appl. No.: 11/726,178

(22) Filed: Mar. 20, 2007

(65) Prior Publication Data
US 2008/0034745 A1 Feb. 14, 2008

(30) Foreign Application Priority Data
Mar. 21, 2006 (DE) ................... 10 2006 012 986

(51) Int. Cl.
*F16D 31/02* (2006.01)
(52) U.S. Cl. .............................. 60/476; 60/328; 60/475
(58) Field of Classification Search ................... 60/328, 60/413, 456, 475, 476, 477, 478; 310/52, 310/54, 61; 417/271
See application file for complete search history.

(56) References Cited

U.S. PATENT DOCUMENTS

| 4,529,362 A * | 7/1985 | Ichiryu et al. ............... 417/271 |
| 4,630,441 A | 12/1986 | Chamberlain |
| 4,850,812 A * | 7/1989 | Voight ......................... 417/271 |
| 5,109,672 A | 5/1992 | Chenoweth et al. |
| 6,796,120 B2 * | 9/2004 | Franchet et al. ................ 60/475 |

FOREIGN PATENT DOCUMENTS

| DE | 2538078 | 3/1976 |
| DE | 69404561 | 1/1998 |
| WO | 98/11358 | 3/1998 |

* cited by examiner

*Primary Examiner*—Michael Leslie
(74) *Attorney, Agent, or Firm*—Dilworth & Barrese, LLP.

(57) ABSTRACT

The present invention relates to an actuation device for the actuating of an adjustment surface of an aircraft such as an elevator, a rudder or the like, of landing gear or another aircraft or surface vehicle actuator, comprising an electrohydraulic actuator having a servo control cylinder, a pump for pressure fluid action on the servo control cylinder as well as an electric motor for the actuation of the pump, with the electric motor having a liquid cooling. In accordance with the invention, the actuation device is characterized in that a leak flow of the pump is guided over a leak passage through the electric motor to cool the electric motor.

18 Claims, 4 Drawing Sheets

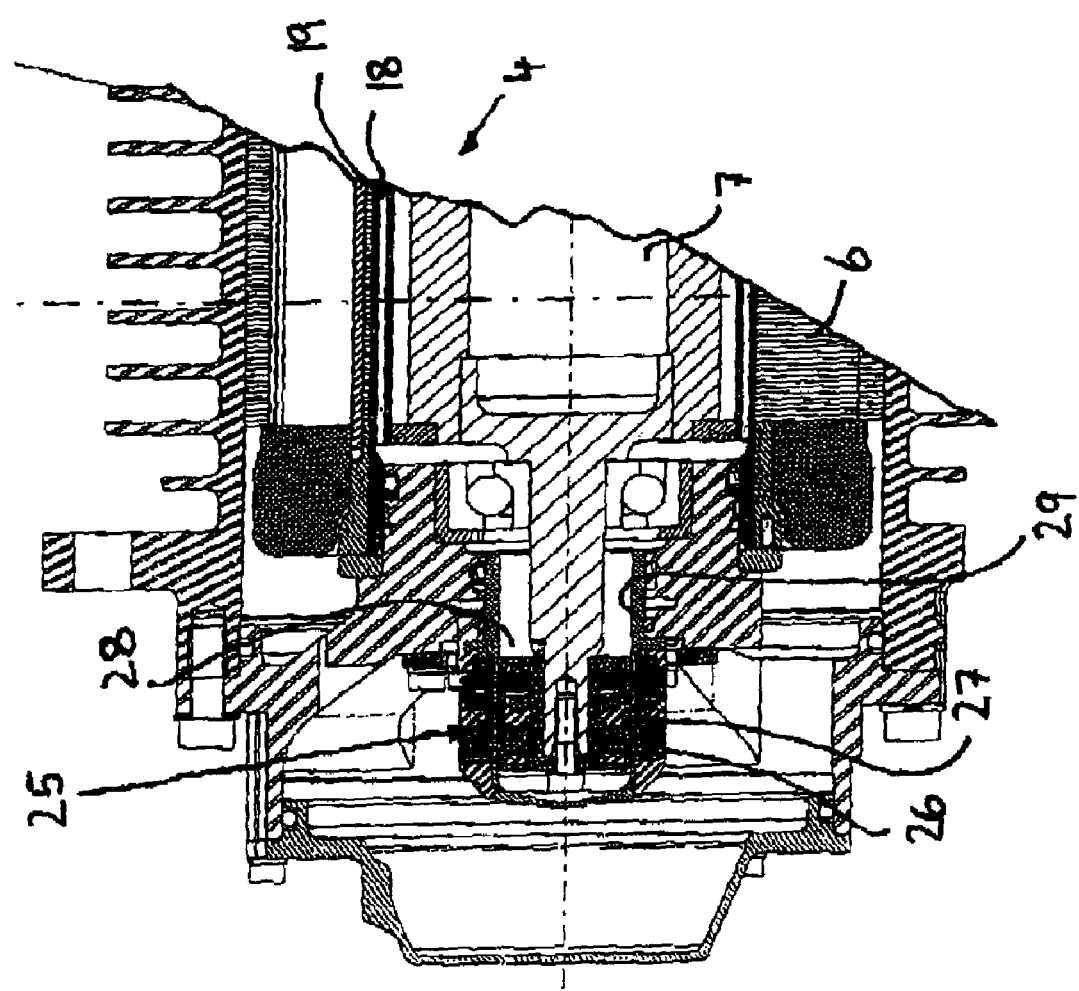

ACTUATION DEVICE

BACKGROUND OF THE INVENTION

The present invention relates to an actuation device for the actuating of an adjustment surface of an aircraft such as an elevator, a rudder or the like, of landing gear or another aircraft or surface vehicle actuator, comprising an electrohydraulic actuator having a servo control cylinder, a pump for pressure fluid action on the servo control cylinder as well as an electric motor for the actuation of the pump, with the electric motor having a liquid cooling.

In aircraft, actuators such as elevators or ailerons are frequently actuated by means of a hydraulic cylinder which is connected to a central hydraulic supply via corresponding hydraulic lines. With such a central supply system, however, depending on the position of the servo control cylinder to be actuated, long supply lines are necessary which have a corresponding hydraulic volume and bring about a high weight. In addition, such a central hydraulic system has to include a plurality of valves to supply the various servo control cylinders with the respectively required hydraulic amount, which results in complex hydraulic systems.

In contrast to such a central supply system, decentralized actuator units have already been proposed which work with the assistance of so-called electrohydraulic actuators in which the respective servo control cylinder can be acted on by a decentralized pump which can be driven by an associated electric motor. In this connection, the electric motor and the pump as well as, optionally, also the servo control cylinder are combined into one assembly so that long hydraulic lines between the pump and the servo control cylinder can be saved. Such an electrohydraulic actuator is shown, for example, by U.S. Pat. No. 4,630,441 in which the electric motor, the pump and the servo control cylinder of the actuator are integrated into a common housing. In this context, the pump is configured as an axial piston pump which can be driven in opposite directions by the electric motor in order to be able to generate opposite actuation movements of the servo control cylinder depending on the direction of rotation of the motor. The pressure chambers of the servo control cylinder are connected to the pressure connections of the pump.

With such electrohydraulic actuator units, heating and temperature problems occasionally occur, in particular at the electric motor. WO 98/11358 suggests, for this purpose, using a liquid-cooled motor into which some of the hydraulic fluid provided by the pump is introduced to cool the motor. For this purpose, a valve arrangement is provided between the pump and the servo control cylinder and branches off some of the pressure fluid and introduces it into the electric motor to cool it. This additional valve arrangement, however, has to be controlled separately again and makes the construction of the actuator complicated; in addition, it brings along additional weight, which should be avoided in particular in the aerospace sector. In addition, the branching off of the pressure fluid for cooling purposes can impair the efficiency of the actuator unit.

SUMMARY OF THE INVENTION

Starting from this, it is the underlying object of the invention to provide an improved actuation device of the initially named kind which avoids disadvantages of the prior art and further develops the latter in an advantageous manner. A simple, but nevertheless efficient cooling of the electric motor of the electrohydraulic actuator should preferably be achieved.

This object is solved in accordance with the invention by an actuation device as described herein. Preferred aspects of the invention are also the subject of the invention herein.

It is therefore proposed to cool the electric motor using the pressure fluid which is actually provided for the actuation of the servo control cylinder, but not to branch off pressure fluid from the pressure fluid connection circuit between the pump and the servo control cylinder, but rather to utilize the leak flow of the pump. In accordance with the invention, the leak flow of the pump is guided through the electric motor via a leak passage for the cooling of the electric motor. Unlike in the prior art, it is not the useful flow or useful circuit between the pump and the servo control cylinder that is tapped to cool the electric motor, but rather the otherwise useless leak flow of the pump which, however, nevertheless occurs due to leaks and the like.

In particular, valves are dispensed with in this context such as are used in the prior art to branch off some of the pressure fluid from the pressure connection circuit between the pump and the servo control cylinder and to guide it into the motor. In a further development of the invention, the leak flow of the pump is guided into and through the electric motor without valves. This not only permits a particularly simple and so cost-effective solution, but also has a very light construction since the liquid cooling for the electric motor manages without additional components such as valves.

The pump and the electric motor are advantageously received in a common housing, optionally a multi-part housing, in which the aforesaid leak passage is formed which connects a pump housing part to a motor housing part. The pump and the electric motor as well as, optionally, also the servo control cylinder are advantageously combined to form an assembly, with the leak flow from the pump housing part being introduced directly into the motor housing part without any additional external lines.

The introduction of the leak flow into the electric motor housing part is advantageously achieved in that a drive shaft of the electric motor is guided into the pump housing part without shaft seals. The electric motor can in particular have a drive shaft portion which projects out of the motor housing portion at the end face and is guided into the pump housing part where the pump is coupled to the said drive shaft to drive the pump. In the region of the shaft passage or transition between the motor housing part and the pump housing part, a ring gap can be provided between the drive shaft and the corresponding housing part which does not have a shaft seal and via which the leak flow is guided out of the pump into the electric motor.

The pump of the electrohydraulic actuator can generally have different configurations. In accordance with an advantageous embodiment of the invention, an axial piston pump is provided whose axial pistons are driven via a swash plate received in a swash plate space. The leak of the pump occurring in this swash plate space is advantageously used for the cooling of the electric motor. The swash plate receiving space of the pump is in flow communication with the electric motor via the aforesaid leak passage.

In a further development of the invention, the leak flow from the pump is guided over the bearing by means of which the drive shaft or the rotor of the electric motor is rotatably journaled relative to the stator of the housing, in particular on the motor housing. The leak flow can be guided through a bearing gap and/or through a rolling element cage. Separately configured leak flow passages can hereby be saved, on the one hand. At the same time, the pivot bearing of the electric motor is lubricated.

The leak flow guidance within the electric motor can generally be configured differently. In accordance with an advantageous embodiment of the invention, the electric motor has a rotor chamber in which the rotor of the motor is received as well as a stator chamber which is separated therefrom in a fluid-tight manner and in which the stator cooperating with the rotor is received. The leak flow is preferably guided through the rotor chamber separated from the stator chamber in a fluid tight manner. The rotor runs in the wet, whereas the stator is arranged in the dry. This arrangement of a wet-running rotor is particularly advantageous when the rotor is arranged inwardly disposed and the stator is arranged outwardly disposed.

The electric motor can in particular have a seal sleeve which extends between the rotor and the stator of the electric motor and seals the winding of the motor in a fluid tight manner with respect to the leak flow. The named leak flow is advantageously introduced into the named seal sleeve at the end face and guided out again on the opposite side at the end face.

The named seal sleeve can be supported radially at the stator and/or at a motor housing portion and can be sealed via a ring seal, for example.

In a further development of the invention, the electric motor can preferably be connected on the side disposed opposite the pump to a rotary encoder which accurately indicates the rotary position of the electric motor. A resolver having an inwardly disposed rotor and an outwardly disposed stator, which can have the respectively corresponding windings, is advantageously provided. In a further development of the invention, the rotor is arranged to run wet and is received in a rotor chamber which is sealed in a fluid tight manner with respect to a stator chamber. A seat sleeve can in turn be provided which is arranged between the rotor and the stator, is advantageously radially supported at the stator, and which separates the stator chamber from the rotor chamber in a fluid tight manner. To the extent that the wet-running rotor of the resolver has a winding, the winding can be encapsulated in a fluid tight manner in a further development o the invention.

In a further development of the invention, the electric motor includes a leak drain which can be connected to a reservoir of the electrohydraulic actuator unit. The said reservoir is advantageously configured such that the leak flow guided into the reservoir is guided along a housing wall of the reservoir, in particular along an outer wall, whereby a good heat transfer and a good heat dissipation are achieved. The reservoir can in particular comprise a bellows which is received in a reservoir housing. The leak flow is fed in and/or stored outside the bellows between the reservoir housing and the bellows so that a good heat dissipation over the reservoir housing wall is ensured.

BRIEF DESCRIPTION OF THE DRAWINGS

The invention will be explained in more detail in the following with respect to a preferred embodiment and to associated drawings. There are shown in the drawings:

FIG. 4: a sectioned longitudinal section through the electric motor/pump unit in accordance with an alternative embodiment in the region of a resolver unit.

DESCRIPTION OF THE PREFERRRED EMBODIMENTS

Figure 1:
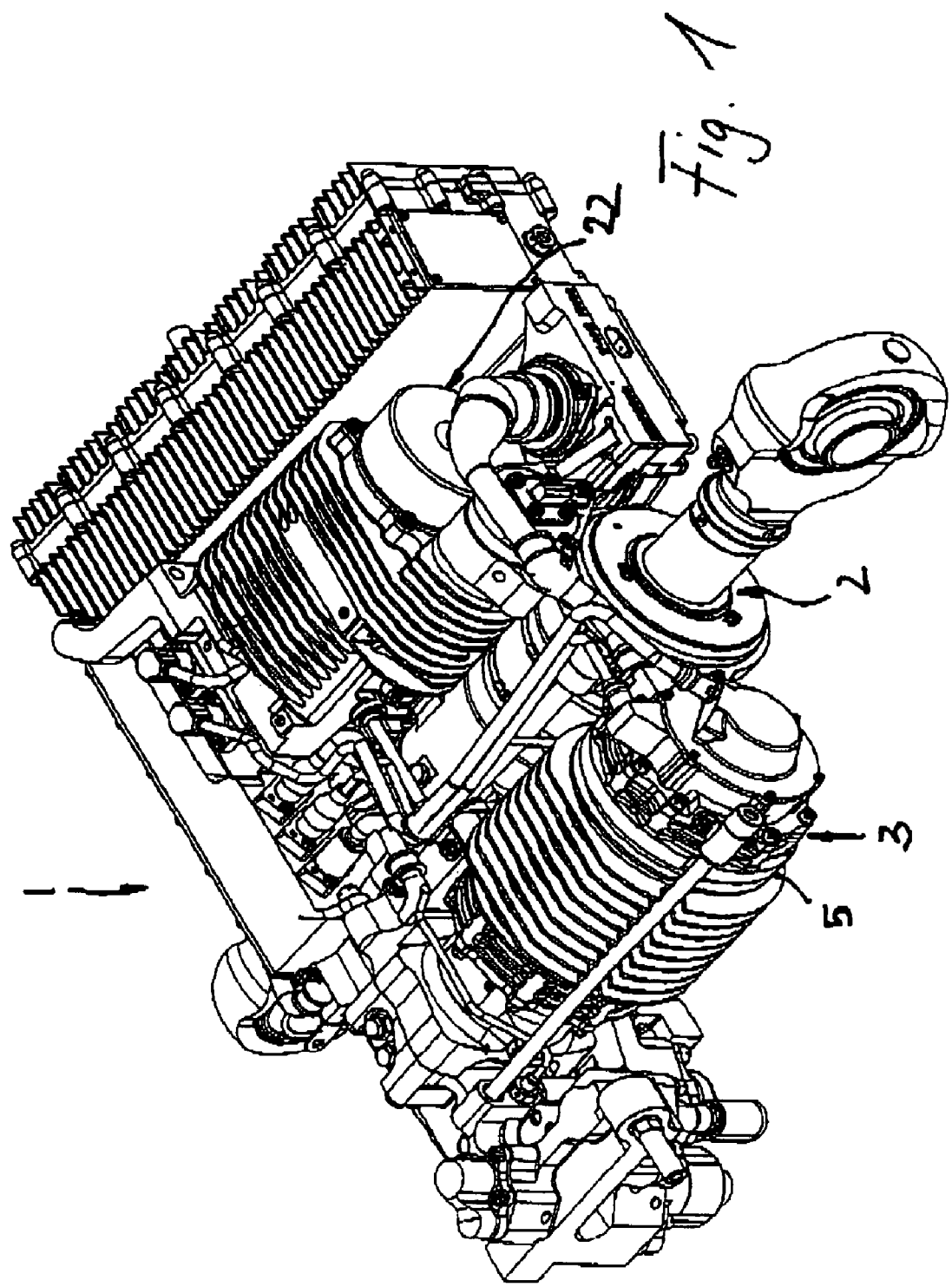
FIG. 1: a perspective, schematic illustration of the electrohydraulic actuator of an actuating device for use in aircraft or space craft in accordance with an advantageous embodiment of the invention, with a servo control cylinder of the actuator unit being arranged between an electric motor/pump unit and a reservoir unit of the actuator unit.

In the electrohydraulic actuator 1 shown in FIG. 1, a dual-action servo control cylinder 2, a pump 3 operatively connected to the servo control cylinder, an electric motor 4 driving the pump 3 and a common housing 5 are combined to form an assembly. The pressure connections of the pump 3 are connected to the pressure chambers of the servo control cylinder 2 in a manner known per se so that the servo control cylinder 2 can be moved to and fro by actuation of the electric motor 4 which drives the pump 3 accordingly.

Figure 2:
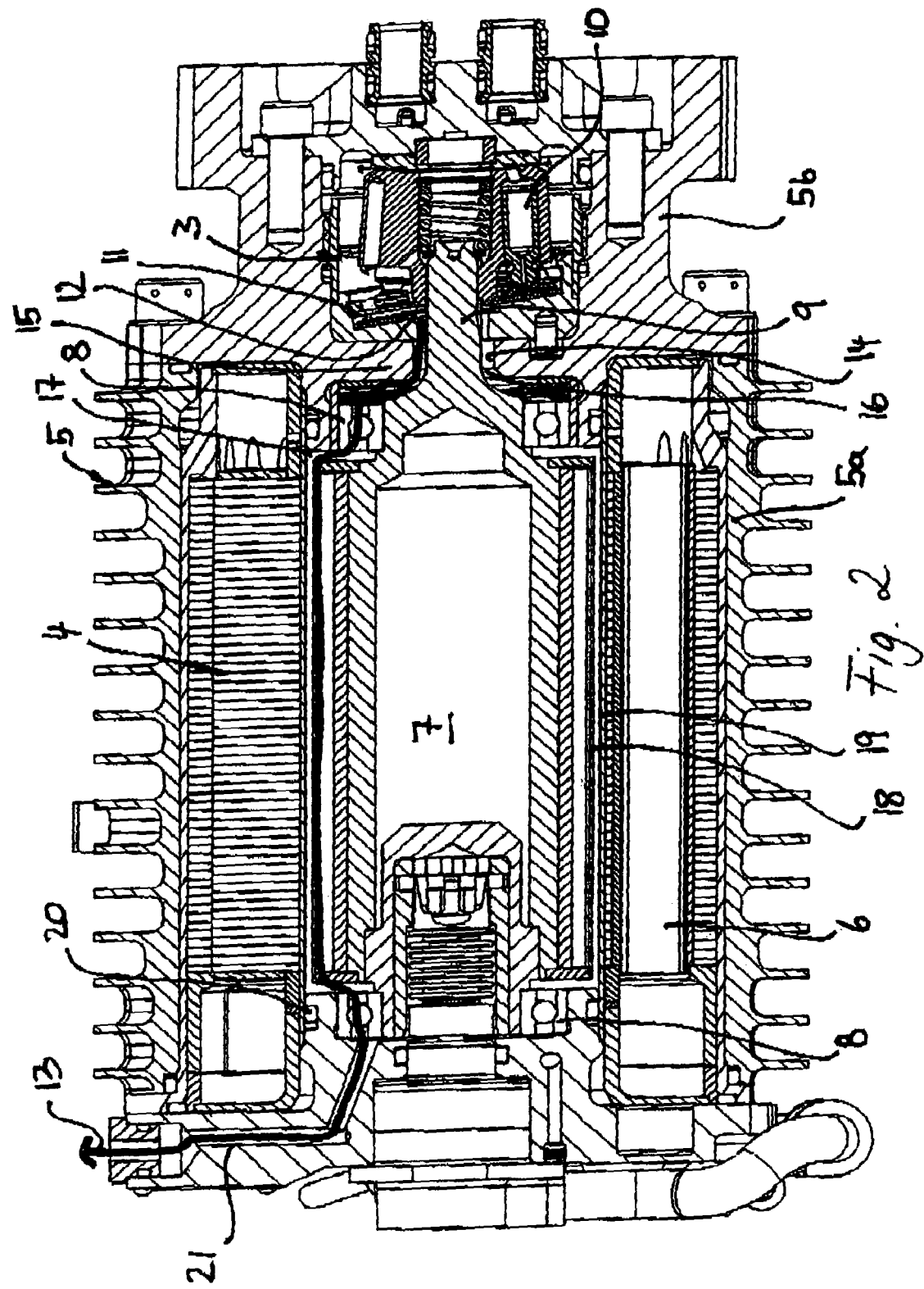
FIG. 2: a longitudinal section through the electric motor/pump unit of the electrohydraulic actuator of FIG. 1.

As FIG. 2 shows, the electric motor 4 and the pump 3 are arranged in a common housing 5. The electric motor 4 includes an outwardly disposed, ring-shaped stator 6 in which the rotor 7 of the electric motor 4 extends. The named rotor 7 is supported in the embodiment drawn at its oppositely disposed ends by means of two pivot bearings. 8 in the form of rolling bearings at corresponding housing portions. The rotor 7 forms, at its one end, a drive shaft portion 9 which extends out of the motor housing part 5a at the end face and into the pump housing part 5b. The pump 3, which is configured as an axial piston pump whose pistons 10 are driven axially by means of a swash plate 11 which is arranged in a swash plate receiving space 12, is seated on the drive shaft portion 9 of stub shaft shape.

A leak flow which is marked by the arrows 13 occurs in the named swash plate receiving space 12. The swash plate receiving space 12 forms the starting point Of the leak flow 13 in this respect by means of which the electric motor 4 is cooled.

The aforesaid drive shaft portion 9, to which the pump 3 is connected extends through the passage recess 14 in the web-shaped housing wall 15 without a wave seal. The ring gap 16 between the drive shaft portion 9 and the housing wall 15, which connects the pump housing part 5b to the motor housing part 5a, forms a part of the leak passage 17 which connects the pump 3 to the electric motor 4. As FIG. 2 shows the leak flow 13 entering into the motor housing part 5a via the ring gap 16 can enter into a ring-shaped inner motor space between the rotor 7 and the stator 6 by the aforesaid bearings 8 with which the rotor 7 is rotatably journaled. The said bearings 8 are hereby simultaneously lubricated.

The aforesaid inner motor space 18 forms the rotor chamber in which the named rotor is rotatably received and which is sealed in a fluid tight manner by a sleeve 19 outwardly toward the stator 6 or to the stator chamber receiving the stator 6. The seal sleeve 19 in this respect is seated in the inner recess of the stator 6 and its ends are pushed onto the oppositely disposed bearing flanges of the housing 5 at which the aforesaid bearings 8 are supported. The sleeve 19 is sealed in a fluid tight manner with respect to the inner motor space 18 or the rotor chamber via ring seals 20.

Figure 3:
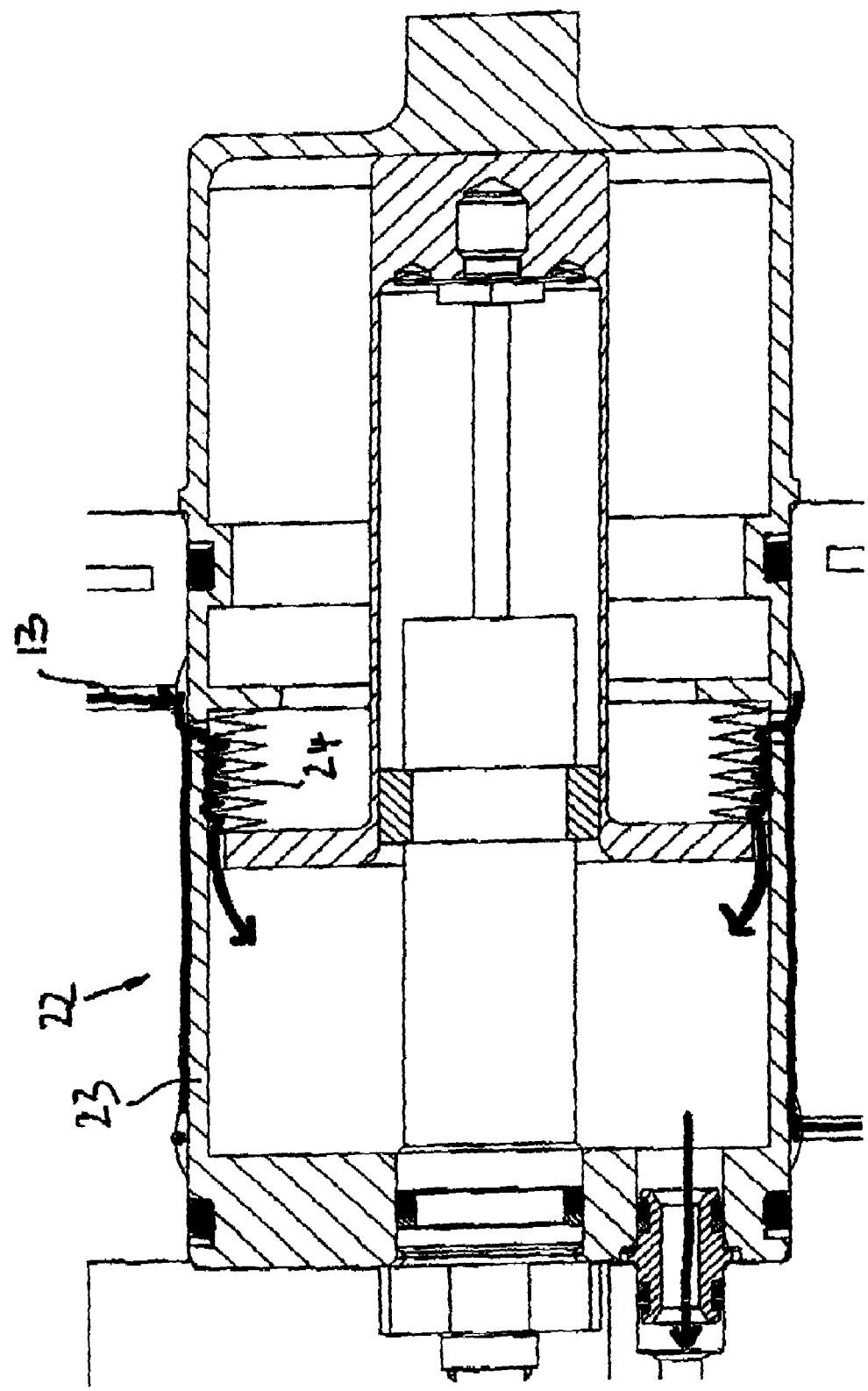
FIG. 3: a longitudinal section through the bellows reservoir of the electrohydraulic actuator of FIG. 1.

The leak flow 13 is in turn guided through the bearing 8 at the end of the rotor 7 disposed opposite the pump 3 and is guided out of the motor housing part 5a via a leak drain passage 21. As FIG. 3 shows, the named leak drain passage 21 is connected to a reservoir 22 via a connection passage which is not shown separately. The said reservoir 22 includes a reservoir housing 23 (cf. FIG. 1), in which a gas-filled volume-variable bellows 24 is received. The reservoir 22 is configured in this respect such that the fluid introduced is led along the housing wall of the reservoir housing 23, whereby the heat exchange with the environment can be improved and the hot volume flow can be cooled quickly. The fluid led into the reservoir 22 is led in or stored outside the said bellows 24 between the bellows 24 and the reservoir housing 23.

FIG. 4 shows an embodiment of a rotary encoder 25 which can be arranged at the end of the rotor 7 disposed opposite the pump 3. In this embodiment, a resolver having an inwardly disposed rotor 26 as well as a stator 27 surrounding it in ring shape, which can each have corresponding windings, is provided as the rotary encoder 25. The rotor 26 is arranged in a wet-running manner, i.e. it is received in a rotor chamber 28 which is in flow communication with the aforesaid ring-shaped inner motor space 15 via which the leak flow is guided for motor cooling. The rotor 26 or its rotor winding is encapsulated and is seated on a stub shaft connected to the rotor 7. In this connection, the rotor chamber 28 is separated in a fluid tight manner from the stator 27 via a sleeve or a pot 29. The sealing pot 29 is seated in the housing portion at which the bearing 8 is supported for the rotatable support of the rotor 7.

The invention claimed is:

1. An actuation device for the actuation of an aerodynamic adjustment surface of an aircraft, landing gear or another aircraft or surface vehicle actuator, comprising an electrohydraulic actuator (1) having a servo control cylinder (2), a pump (3) for pressure fluid action on the servo control cylinder (2) as well as an electric motor (4) for the actuation of the pump (3), with the electric motor (4) having a liquid cooling, wherein a leak flow (13) of the pump (3) is guided via a leak passage (17) through the electric motor (4) for the cooling of the electric motor (4), wherein said electric motor (4) has a seal sleeve (19) extending between the rotor and stator of the electric motor and sealing the winding of the electric motor in a fluid tight manner with respect to the leak flow, wherein said leak flow is guided within the seal sleeve (19) from a first rotor end face to an oppositely disposed second rotor end face, wherein the leak flow leaving said seal sleeve (19) and the electric motor (4) is guided into a reservoir (22) which has a bellows (24) received in a reservoir housing (23) with the leak flow (13) being fed into and/or stored in a gap defined outside the bellows (24) between said reservoir housing (23) and the bellows (24).

2. An actuation device in accordance with claim 1, wherein the leak flow (17) is guided into and through the electric motor (4) free of valves.

3. An actuation device in accordance with claim 1, wherein the pump (3) and the electric motor (4) are received in a common housing (5) in which the leak passage (17) is formed which connects a pump housing part (5b) to a motor housing part (5a).

4. An actuation device in accordance with claim 1, wherein a drive shaft portion of the electric motor (4) is guided into the pump housing part (5b) without a shaft seal.

5. An actuation device in accordance with claim 3, wherein the pump (3) is connected to a drive shaft portion which is guided out of the motor housing portion (5a) at the end face and is guided into the pump housing part (5b), wherein the leak flow (13) is guided out of the pump housing part (5b) into the motor housing part (5a) through a ring gap (16) between the drive shaft portion (9) and the pump housing part and/or motor housing part (5b, 5a).

6. An actuation device in accordance with claim 1, wherein the leak flow (13) is guided through at least one pivot bearing (8) of the electric motor (4).

7. An actuation device in accordance with claim 1, wherein the electric motor (4) has an inwardly disposed rotor chamber (18) which is separated from a stator chamber in a fluid tight manner.

8. An actuation device in accordance with claim 1, wherein the seal sleeve (19) is radially supported at the outwardly disposed stator.

9. An actuation device in accordance with claim 1, wherein a rotary encoder (25) is integrated into the electric motor (4).

10. An actuation device in accordance with claim 9, wherein the rotary encoder (25) has a wet-running rotor (26) which is separated from a stator (27) of the rotary encoder (25) in a fluid tight manner via a seal sleeve and/or a sealing pot (29).

11. An actuation device in accordance with claim 9, wherein the rotary encoder (25) is connected to a drive shaft portion of the electric motor (4) which is guided out of the motor housing part (5a) without a shaft seal, and a rotor chamber (28) receiving the rotor (26) of the rotary encoder (25) is in flow communication with an inner motor space (18) through which the leak flow is guided.

12. An actuation device in accordance with claim 1, wherein the electric motor (4) has a leak drain (21) which is connected to the reservoir (22).

13. An actuation device in accordance with claim 12, wherein the reservoir (22) is configured such that the leak flow (13) guided into the reservoir (22) is guided along a housing wall of the reservoir (22).

14. An actuation device in accordance with claim 1, wherein the pump (3) is configured as an axial piston pump which has a swash plate (11) arranged in a swash plate receiving space (12), with the said swash plate receiving space (12) being connected to the electric motor (4) via the leak passage (17).

15. An actuation device in accordance with claim 4, wherein the pump (3) is connected to a drive shaft portion which is guided out of the motor housing portion (5a) at the end face and is guided into the pump housing part (5a), wherein the leak flow (13) is guided out of the pump housing part (5a) into the motor housing part (5a) through a ring gap (16) between the drive shaft portion (9) and the pump housing part and/or motor housing part (5a, 5a).

16. An actuation device in accordance with claim 1, wherein the seal sleeve (19) is radially supported at the outwardly disposed stator.

17. An actuation device in accordance with claim 10, wherein the rotary encoder (25) is connected to a drive shaft portion of the electric motor (4) which is guided out of the motor housing part (5a) without a shaft seal, and a the rotor chamber (28) receiving the rotor (26) of the rotary encoder (25) is in flow communication with an inner motor space (18) through which the leak flow is guided.

18. The actuation device of claim 1, including inlet and outlet openings at respective opposite ends of the gap to permit flow of the pressure fluid therethrough.

* * * * *